(12) United States Patent
Sugiyama et al.

(10) Patent No.: US 9,648,109 B2
(45) Date of Patent: May 9, 2017

(54) IMAGE PROCESSING APPARATUS, SHARED ADDRESS BOOK DISPLAY CONTROL METHOD FOR THE SAME, RECORDING MEDIUM

(71) Applicant: KONICA MINOLTA, INC., Chiyoda-ku, Tokyo (JP)

(72) Inventors: Takanobu Sugiyama, Toyokawa (JP); Takashi Oikawa, Toyohashi (JP); Tatsuya Kitaguchi, Toyokawa (JP); Tomoyuki Atsumi, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/007,667

(22) Filed: Jan. 27, 2016

(65) Prior Publication Data
US 2016/0219190 A1    Jul. 28, 2016

(30) Foreign Application Priority Data
Jan. 27, 2015   (JP) .................................. 2015-13766

(51) Int. Cl.
*H04N 1/04*    (2006.01)
*H04L 29/08*   (2006.01)
*H04L 12/58*   (2006.01)
*H04M 1/2745*  (2006.01)

(52) U.S. Cl.
CPC .............. *H04L 67/12* (2013.01); *H04L 51/22* (2013.01); *H04L 67/306* (2013.01); *H04M 1/274508* (2013.01)

(58) Field of Classification Search
CPC ........ H04L 67/306; H04L 67/12; H04L 51/22
USPC ....................................... 358/1.14, 1.15, 1.9
See application file for complete search history.

(56) References Cited

U.S. PATENT DOCUMENTS

2004/0133561 A1* 7/2004 Burke .................. G06Q 10/107
2014/0355037 A1* 12/2014 Yoneda ................ H04N 1/4406
                                                            358/1.14

FOREIGN PATENT DOCUMENTS

JP         2011-216097 A    10/2011

* cited by examiner

*Primary Examiner* — Houshang Safaipour
(74) *Attorney, Agent, or Firm* — Buchanan Ingersoll & Rooney PC

(57) ABSTRACT

An image processing apparatus includes a communicator portion that communicates with a portable terminal apparatus having an address book, a contact data obtaining portion that obtains contacts from the address book, the contacts including contact names and addresses, a registration portion that registers the contacts to a shared address book along with user identification information indicating the log-in user, a display, and a display controller that makes the display show the contacts at least by the contact name, the contacts being registered in the shared address book, that judges whether or not the shared address book contains contacts with different contact names but with identical addresses, and that, if it contains contacts with different contact names but with identical addresses, makes the display show any of the contacts by the contact name, the any contact having the user identification information indicating the log-in user.

19 Claims, 12 Drawing Sheets

| Contact Name | Address |
|---|---|
| ... | |
| Mr. Sasaki | sasaki@xxx.com |
| Mr. Sato | sato@xxx.com |
| Mr. Sano | sano@xxx.com |
| ... | |

FIG.2

| Contact Name | Address |
|---|---|
| ... | |
| Junichi Koizumi | koizumi@xxx.com |
| Taro Sato | sato@xxx.com |
| Jun Takada | takada@xxx.com |
| ... | |

FIG.3

| Contact Name | Address |
|---|---|
| ... | |
| Client Mr. Sasaki | sasaki@xxx.com |
| Client Mr. Sato | sato@xxx.com |
| Client Mr. Sano | sano@xxx.com |
| ... | |

FIG.4

| Contact Name | Address | User Identification Information |
|---|---|---|
| ... | | |
| Mr. Sasaki | sasaki@xxx.com | User 1 |
| Mr. Sato | sato@xxx.com | User 1 |
| Mr. Sano | sano@xxx.com | User 1 |
| ... | | |

FIG.5

| Contact Name | Address | User Identification Information |
|---|---|---|
| ... | | |
| Junichi Koizumi | koizumi@xxx.com | User 2 |
| Mr. Sasaki | sasaki@xxx.com | User 1 |
| Mr. Sato | sato@xxx.com | User 1 |
| Taro Sato | sato@xxx.com | User 2 |
| Mr. Sano | sano@xxx.com | User 1 |
| Jun Takada | takada@xxx.com | User 2 |
| ... | | |

| Contact Name | Address | User Identification Information | Contact Duplication Information |
|---|---|---|---|
| ... | | | |
| Mr. Sasaki | sasaki@xxx.com | User 1 | No Duplicate |
| Mr. Sato | sato@xxx.com | User 1 | No Duplicate |
| Mr. Sano | sano@xxx.com | User 1 | No Duplicate |
| ... | | | |

FIG.10

| Contact Name | Address | User Identification Information | Contact Duplication Information |
|---|---|---|---|
| ... | | | |
| Junichi Koizumi | koizumi@xxx.com | User 2 | No Duplicate |
| Mr. Sasaki | sasaki@xxx.com | User 1 | No Duplicate |
| Mr. Sato | sato@xxx.com | User 1 | Duplicate |
| Taro Sato | sato@xxx.com | User 2 | Duplicate |
| Mr. Sano | sano@xxx.com | User 1 | No Duplicate |
| Jun Takada | takada@xxx.com | User 2 | No Duplicate |
| ... | | | |

FIG.11

| Contact Name | Address | User Identification Information | Contact Duplication Information |
|---|---|---|---|
| ... | | | |
| Mr. Sasaki | sasaki@xxx.com | User 1 | No Duplicate |
| Mr. Sato | sato@xxx.com | User 1 | No Duplicate |
| Taro Sato | sato.taro@xxx.com | User 2 | No Duplicate |
| Mr. Sano | sano@xxx.com | User 1 | No Duplicate |
| ... | | | |

FIG.12

| Contact Name | Address | User Identification Information | Contact Duplication Information |
|---|---|---|---|
| ... | | | |
| Mr. Sasaki | sasaki@xxx.com | User 1 | No Duplicate |
| Mr. Sato | sato@xxx.com | User 1 | Duplicate |
| Client Mr. Sato | sato@xxx.com | User 3 | Duplicate |
| Taro Sato | sato.taro@xxx.com | User 2 | No Duplicate |
| Mr. Sano | sano@xxx.com | User 1 | No Duplicate |
| ... | | | |

IMAGE PROCESSING APPARATUS, SHARED ADDRESS BOOK DISPLAY CONTROL METHOD FOR THE SAME, RECORDING MEDIUM

This application claims priority under 35 U.S.C. §119 to Japanese Patent Application No. 2015-013766 filed on Jan. 27, 2015, the entire disclosure of which is incorporated herein by reference in its entirety.

BACKGROUND OF THE INVENTION

Field of the Invention

The present invention relates to an image processing apparatus such as a multifunctional digital image forming apparatus (i.e., a multi-function peripheral abbreviated as MFP) having various functions, e.g., printer function, facsimile function, and scanner function, a shared address book display control method for the image processing apparatus, and a recording medium.

Description of the Related Art

The following description sets forth the inventor's knowledge of related art and problems therein and should not be construed as an admission of knowledge in the prior art.

A portable terminal apparatus having communication function, such as a smartphone and a tablet computer, usually comes equipped with an address book. This address book stores contact data including registered names (contact names) and addresses, for example e-mail addresses, of users who have connections with the owner user of the portable terminal apparatus.

There is a recent technique for a MFP as mentioned above to collect contact data from address books of portable terminal apparatuses and make use of the collected contact data in address settings for data transmission. Also, there is a common technique for such a MFP to register contact data, which is collected from portable terminal apparatuses of users, to a shared address book that is jointly owned by multiple users. This will meet the needs when they wish to share and freely access specific contacts such as clients and cooperative business sections.

Since such a shared address book contains contact data from personal address books created by different users, it may have contacts with different contact names but with identical e-mail addresses. For example, User 1 may have registered in his/her address book a contact with the contact name "Mr. Sato" and the e-mail address sato@xxx.com, User 2 may have registered in his/her address book a contact with the contact name "Taro Sato" and the e-mail address "sato@xxx.com", and User 3 may have registered in his/her address book a contact with the contact name "Client Mr. Sato" and the e-mail address "sato@xxx.com". In this case, after the MFP collects these contacts and registers to the shared address book, the shared address book results in containing contacts with different contact names but with identical e-mail addresses (the same user). It will be confusing to a user trying to make a choice from a contact list.

Japanese Laid-Open Patent Publication No. 2011-216097 discloses a technique that ensures proper mail data delivery by setting a new e-mail address instead of an old e-mail address when the address of a recipient has been changed. Specifically, the new and old e-mail addresses are registered to an address book in association with each other, and when a user creates mail data, an e-mail address set in the mail data is compared to the old e-mail addresses registered in the address book. If the e-mail address set in the mail data is identical with any of the old e-mail addresses, it is replaced with the new e-mail address registered in the same record in the address book. So, in other words, the technique ensures proper mail data delivery while the user does not need to be bothered by checking every e-mail address if it has been changed and rewriting an old e-mail address with a new e-mail address.

Japanese Laid-Open Patent Publication No. 2011-216097 discloses a technique of setting a new e-mail address instead of an old e-mail address when the address of a recipient has been changed, which does not bring a solution to the outstanding problem. That is, a MFP simply collects contact data from address books of portable terminal apparatuses of users and registers the collected data to a shared address book, and thus the shared address book can possibly result in containing contacts with different contact names but with identical e-mail addresses (the same user). If it actually results in that, it still will be confusing to a user trying to make a choice from a contact list.

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to an image processing apparatus including:

a communicator portion that communicates with a portable terminal apparatus having an address book;

a contact data obtaining portion that obtains contacts from the address book of the portable terminal apparatus upon a user being logged in to the image processing apparatus through the communicator portion from the portable terminal apparatus, the contacts including contact names and addresses;

a registration portion that registers the contacts to a shared address book as shared data along with user identification information indicating the log-in user, the contacts being obtained by the contact data obtaining portion, the contacts including the contact names and the addresses;

a display; and a display controller that makes the display show the contacts at least by the contact name for the log-in user making a choice in address settings for transmission, the contacts being registered in the shared address book, that judges whether or not the shared address book contains contacts with different contact names but with identical addresses, and that, if it contains contacts with different contact names but with identical addresses, makes the display show any of the contacts by the contact name, the any contact having the user identification information indicating the log-in user.

A second aspect of the present invention relates to a shared address book display control method for an image processing apparatus, the shared address book display control method including:

communicating with a portable terminal apparatus having an address book;

obtaining contacts from the address book of the portable terminal apparatus upon a user being logged in to the image processing apparatus by communicating from the portable terminal apparatus, the contacts including contact names and addresses;

registering the contacts to a shared address book as shared data along with user identification information indicating the log-in user, the contacts being obtained from the address book of the portable terminal apparatus, the contacts including the contact names and the addresses; and making a display show the contacts at least by the contact name for the log-in user making a choice in address settings for transmission, the contacts being registered in the shared address book, judging whether or not the shared address book contains contacts with different contact names but with identical addresses, and, if it contains contacts with different contact names but with identical addresses, making the display show any of the contacts by the contact name, the any contact having the user identification information indicating the log-in user.

A third aspect of the present invention relates to a non-transitory computer-readable recording medium storing a shared address book display control program to make a computer of an image processing apparatus execute:

communicating with a portable terminal apparatus;

obtaining contacts from the portable terminal apparatus upon a user being logged in to the image processing apparatus by communicating from the portable terminal apparatus, the contacts including contact names and addresses;

registering the contacts to a shared address book as shared data along with user identification information indicating the log-in user, the contacts being obtained from the address book of the portable terminal apparatus, the contacts including the contact names and the addresses; and making a display show the contacts at least by the contact name for the log-in user making a choice in address settings for transmission, the contacts being registered in the shared address book, judging whether or not the shared address book contains contacts with different contact names but with identical addresses, and, if it contains contacts with different contact names but with identical addresses, making the display show any of the contacts by the contact name, the any contact having the user identification information indicating the log-in user.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIG. 2 illustrates contact data registered in a personal address book of a portable terminal apparatus of User 1;

FIG. 3 illustrates contact data registered in a personal address book of a portable terminal apparatus of User 2;

FIG. 4 illustrates contact data registered in a personal address book of a portable terminal apparatus of User 3;

FIG. 5 illustrates a shared address book containing the contact data obtained from the address book of the portable terminal apparatus of User 1;

FIG. 6 illustrates a shared address book containing the contact data obtained from the address books of the portable terminal apparatuses of Users 1 and 2;

FIG. 7 illustrates a display screen showing the contact data while User 1 is logged in;

FIG. 8 illustrates a display screen showing the contact data while User 2 is logged in;

FIG. 9 illustrates a display screen showing the contact data while User 3 is logged in;

FIG. 10 illustrates a shared address book containing the contact data obtained from the address book of the portable terminal apparatus of User 1, along with contact duplication information;

FIG. 11 illustrates a shared address book containing the contact data obtained from the address books of the portable terminal apparatuses of Users 1 and 2, along with contact duplication information;

FIG. 12 illustrates an example of a shared address book containing a contact with an e-mail address having been changed;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
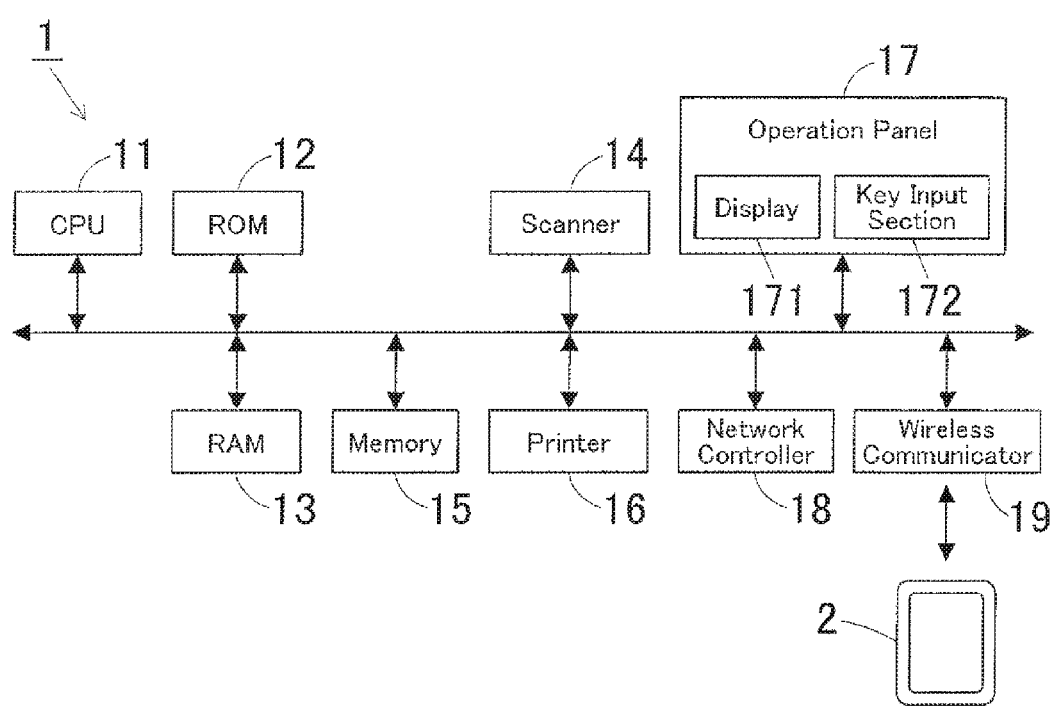
FIG. 1 illustrates a configuration of an image processing apparatus according to one embodiment of the present invention.

FIG. 1 illustrates a configuration of an image processing system according to one embodiment of the present invention. In this embodiment, a MFP, i.e., a multifunctional digital image processing apparatus as described above, is employed as an image processing apparatus 1. Hereinafter, the image processing apparatus will also be referred to as "MFP".

The image processing apparatus 1 is essentially provided with a CPU 11, a ROM 12, a RAM 13, a scanner 14, a memory 15, a printer 16, an operation panel 17, a network controller 18, and a wireless communicator 19.

The CPU 101 controls the image processing apparatus 1 in a unified and systematic manner such that users can use basic functions of the image processing apparatus 1 such as copier function, printer function, scanner function, and facsimile function. Furthermore, the CPU 101 obtains contact data from an address book of the portable terminal apparatus 2 of a log-in user by wirelessly communicating with the portable terminal apparatus 2, and registers the contact data to a shared address book of the image processing apparatus 1 as shared data. Still furthermore, the CPU 101 makes a display 171 show contacts registered in the shared address book when a user uses a data transmission function, e.g., scan-to-email function for scanning a document to obtain image data therefrom by the scanner 14, creating an e-mail message with the image data attached thereto, and transmitting the e-mail message to a user-specified e-mail address. This operation will be later described in details.

The ROM 12 is a memory that stores operation programs for the CPU 11 and other data.

The RAM 13 is a memory that provides a work area for the CPU 11 to perform processing in accordance with an operation program.

The scanner 14 is a reading portion that scans a document to output image data therefrom.

The memory 15 is comprised of a non-volatile memory device such as a hard disk drive (HDD). The memory 15 stores contact data in a shared address book.

The memory 15 also stores authentication information of users, document images obtained by the scanner 14, various applications, and other information and data.

The printer 16 prints images in a specified print mode with image data obtained by the scanner 14, print data received externally, and other data.

The operation panel 17 serves for input for various operations. The operation panel 17 is provided with a display 171, i.e., a touch panel liquid-crystal display that displays messages and operation screens, and a key input section 172 having a numeric keypad, a start key, a stop key, and other keys.

The network controller 18 maintains data transmission and receipt by controlling communications with external apparatuses on the network such as other image forming apparatuses and user terminals.

The wireless communicator 19 wirelessly establishes communications with the portable terminal apparatuses 2 of users who are logged in to the image processing apparatus 1, using a wireless communication technology such as near field communication (NFC). Through the wireless communications, the wireless communicator 19 collects contact data from address books of the portable terminal apparatuses 2.

The portable terminal apparatus 2 is comprised of a smartphone or a tablet computer, for example. The portable terminal apparatus 2 has an address book installed thereon for the owner user of the portable terminal apparatus 2. In this address book, each contact name is connected to an address such as an e-mail address. Hereinafter, portable terminal apparatuses also will be referred to as portable terminals for the sake of simplicity.

To describe the image processing apparatus 1 illustrated in FIG. 1, contact names and addresses (e-mail addresses in this embodiment) included in contact data obtained from the portable terminal 2 of a log-in user are registered to a shared address book stored on the memory 15.

FIG. 2 illustrates contact data registered in a personal address book of the portable terminal 2 of User 1. This personal address book contains a contact with the contact name "Mr. Sasaki" and the address "sasaki@xxx.com", a contact with the contact name "Mr. Sato" and the address "sato@xxx.com", and a contact with the contact name "Mr. Sano" and the address "sano@xxx.com".

FIG. 3 illustrates contact data registered in a personal address book of the portable terminal 2 of User 2. This personal address book contains a contact with the contact name "Junichi Koizumi" and the address "koizumi@xxx.com", a contact with the contact name "Taro Sato" and the address "sato@xxx.com", and a contact with the contact name "Jun Takada" and the address "takada@xxx.com".

FIG. 4 illustrates contact data registered in a personal address book of the portable terminal 2 of User 3. This personal address book contains a contact with the contact name "Client Mr. Sasaki" and the address "sasaki@xxx.com", a contact with the contact name "Client Mr. Sato" and the address "sato@xxx.com", and a contact with the contact name "Client Mr. Sano" and the address "sano@xxx.com".

Figures 6, 7:
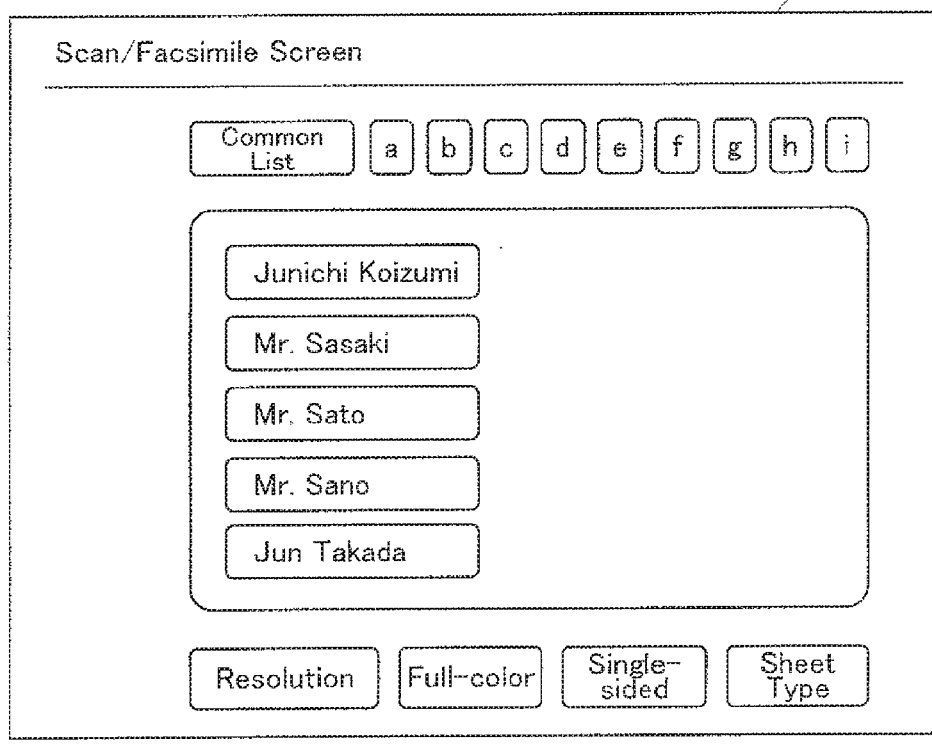

These contacts are collected from the address books of the portable terminals 2 of Users 1 to 3 then registered to a shared address book of the MFP 1 as shared data. When a contact is registered in the shared address book, user identification information indicating the log-in user, i.e., the user who created the address book from which the contact is obtained (a user of the portable terminal 2), is given to the contact. User identification information identifies the user who owns that contact FIG. 5 illustrates a shared address book containing the contact data obtained from the address book of the portable terminal 2 of User 1; FIG. 6 illustrates a shared address book containing the contact data obtained from the address books of the portable terminals 2 of Users 1 and 2. Similarly, the contact data obtained from the address book of the portable terminal 2 of User 3 also will be registered to the shared address book.

As referred to the shared address book, the users had registered contacts with different contact names but with identical addresses. For example, User 1 had registered a contact with the contact name "Mr. Sato", User 2 had registered a contact with the contact name "Taro Sato", User 3 had registered a contact with the contact name "Client Mr. Sato", and these contacts have identical addresses. In this case, the users, who are identified by different user identification information, own contacts with different contact names for the same user. Similarly, User 1 had registered a contact with the contact name "Mr. Sasaki", User 3 had registered a contact with the contact name "Client Mr. Sasaki", and these contacts have identical addresses. Also similarly, User 1 had registered a contact with the contact name "Mr. Sano", User 3 had registered a contact with the contact name "Client Mr. Sano", and these contacts have identical addresses. In each of the cases above, the users, who are identified by different user identification information, own contacts with different contact names for the same user.

Hereinafter, a method of using the shared address book will be described. The MFP 1 displays contacts registered in the shared address book on the display 171 when a log-in user uses a data transmission function, e.g., scan-to-email function. In this embodiment, the contacts are displayed by the contact name. Alternatively, the contacts may be displayed by both the contact name and the address.

Before displaying the contacts, the MFP 1 judges whether or not the shared address book contains contacts with different contact names but with identical addresses. If it contains contacts with different contact names but with identical addresses, any of the contacts, which has the user identification information indicating the log-in user, is displayed by the contact name. None of the contacts may have the user identification information indicating the log-in user; in this case, all the contacts with identical addresses are displayed by the contact name.

FIG. 7 illustrates a display screen showing the contacts while User 1 is logged in. In this embodiment, the shared address book contains some pairs of contacts with different contact names but with identical addresses. They are, for example, contacts with the contact names "Mr. Sato", "Taro Sato", and "Client Mr. Sato", contacts with the contact names "Mr. Sasaki" and "Client Mr. Sasaki", and contacts with the contact names "Mr. Sano" and "Client Mr. Sano". The contacts with the contact names "Junichi Koizumi" and "Jun Takada", which are not registered in the address book of User 1, will be displayed together with the contacts with the contact names "Mr. Sasaki", "Mr. Sato", and "Mr. Sano" and with the user identification information indicating User 1. Meanwhile, the contacts with the contact names "Taro Sato", "Client Mr. Sasaki", "Client Mr. Sato", and "Client Mr. Sano", which are registered in the address books of Users 2 and 3, will be hidden because of having duplicate addresses.

When User 1 selects a desirable contact name from the contact list, the destination will be set to an address corresponding to the selected contact name.

Figure 8:
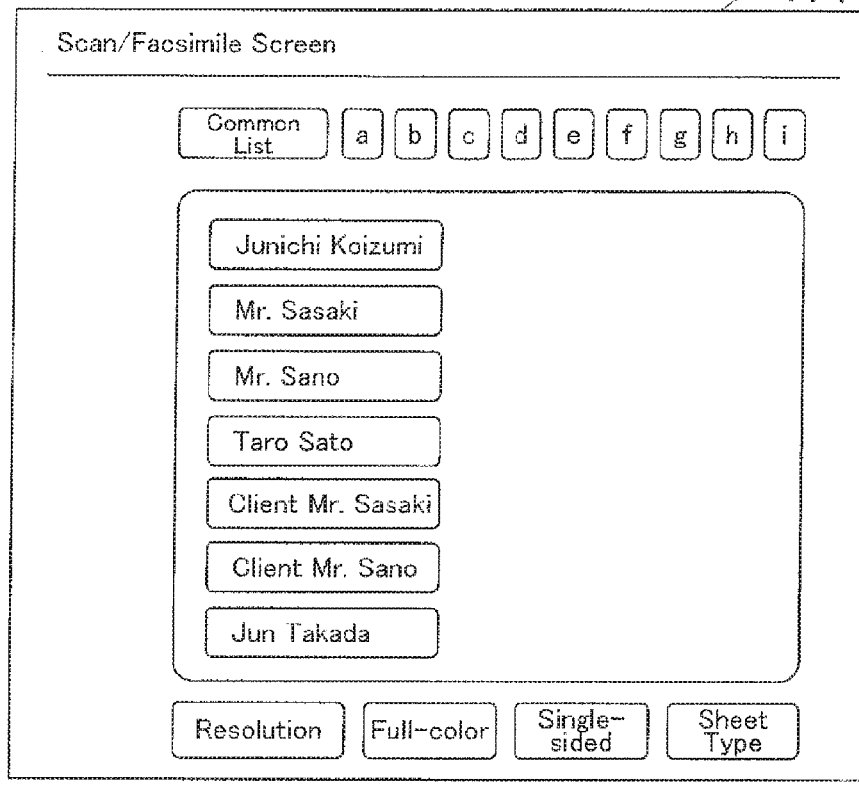

FIG. 8 illustrates a display screen showing the contacts while User 2 is logged in. The contact with the contact name "Taro Sato" is only one duplicate contact owned by User 2, and there is a contact with a different contact name and an identical address. The contact with the contact name "Taro Sato" and with the user Identification information indicating User 2 will be displayed, but the contacts with the contact names "Mr. Sato" and "Client Mr. Sato" will be hidden. The contacts with the contact names "Mr. Sasaki", "Client Mr. Sasaki", "Mr. Sano", and "Client Mr. Sano" will be displayed because of not having the user identification information indicating User 2. As a matter of course, the contacts with the contact names "Junichi Koizumi" and "Jun Takada" also will be displayed.

Figure 9:
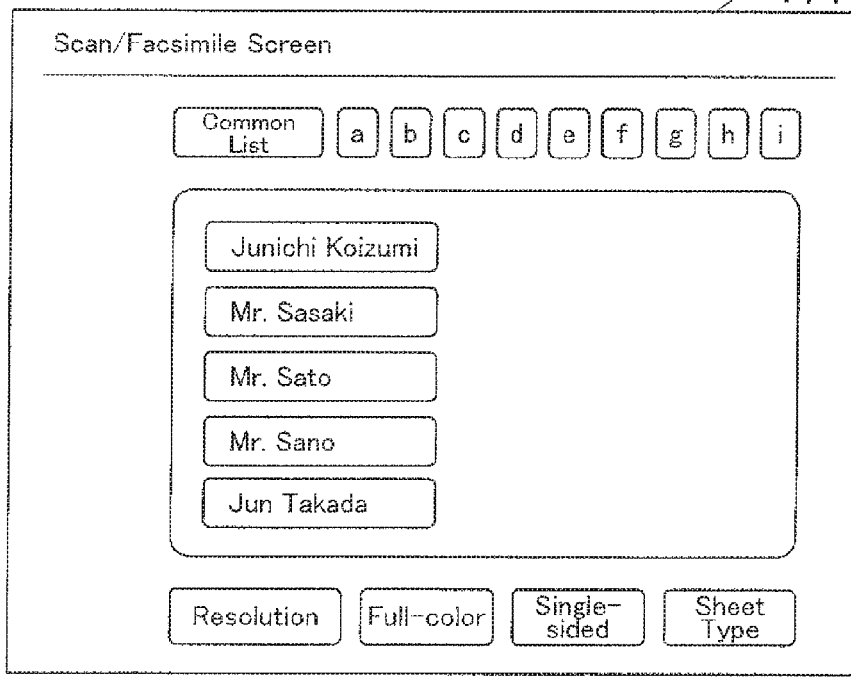

FIG. 9 illustrates a display screen showing the contacts while User 3 is logged in. The contacts with the contact names "Client Mr. Sasaki", "Client Mr. Sato", and "Client Mr. Sano" are duplicate contacts owned by User 3, and about each of these contacts, there is another contact with a different contact name and an identical address. The contacts with the contact names "Juinichi Koizumi" and "Jun Takada" will be displayed together with the contacts with the contact names "Client Mr. Sasaki", "Client Mr. Sato", and "Client Mr. Sano" and with the user identification information indicating User 3. The contacts with the contact names "Mr. Sasaki", "Mr. Sato", "Taro Sato", and "Mr. Sano" will be hidden.

As described above, in this embodiment, if the shared address book contains contacts with different contact names but with identical addresses, any of the contacts, which has the user identification information indicating the log-in user, i.e., which had been registered by the log-in user in his/her address book of the portable terminal 2, is displayed on the display 171 of the MFP 1 by the contact name. So, the log-in user can make a choice from the contact list without being confused by duplicate contacts.

As described above, in this embodiment, it is judged whether or not the shared address book contains contacts with different contact names but with identical addresses. This judgment will hereinafter be described in detail as an example, to which this embodiment should not be limited.

Contact names and addresses included in contact data obtained from the portable terminal 2 of a user are registered to the shared address book as shared data, along with user identification information. When an obtained contact is registered, it is judged whether or not the shared address book contains a contact with an address identical with that of the obtained contact; if it contains such a contact, contact duplication information is given to both the obtained contact and the contact with an address identical with that of the obtained contact. Depending on the presence or absence of the contact duplication information, the MFP 1 is allowed to judge whether or not the shared address book contains contacts with different contact names but with identical addresses.

Specifically, the contact data obtained from the address book of the portable terminal 2 of User 1 is registered to the shared address book as illustrated in FIG. 10, and the contact data obtained from the address book of the portable terminal 2 of User 2 is then registered to the shared address book as illustrated in FIG. 11. Similarly, the contact data obtained from the address book of the portable terminal 2 of User 3 also will be registered to the shared address book.

When the obtained contacts of User 1 are registered, the shared address book contains no contact with an address identical with that of any of the obtained contacts. Thus, as referred to FIG. 10, contact duplication information is not given to any contact (although, only for the sake of explanation, the string "No Duplicate" is written in this figure).

After that, when the obtained contacts of User 2 are registered, the shared address book contains the contact of User 1 with the contact name "Mr. Sato", and this contact has an address identical with that of the contact of User 2 with the contact name "Taro Sato". Thus, as referred to FIG. 11, contact duplication information is given to the contact of User 1 with the contact name "Mr. Sato" (the string "Duplicate" is written in FIG. 11), and it is also given to the contact of User 2 with the contact name "Taro Sato".

In the above-described manner, contact duplication information is given to contacts with different contact names but with identical addresses in the shared address book. If the shared address book contains contacts with the contact duplication information, the MFP 1 displays any of the contacts, which has the user identification information indicating the log-in user, by the contact name, together with the other contacts without the contact duplication information. None of the contacts may have the user identification information indicating the log-in user; in this case, the MFP 1 displays all the contacts with the contact duplication information by the contact name.

In this embodiment, it is judged whether or not the shared address book contains contacts with different contact names but with identical addresses, depending on the presence or absence of the user identification information indicating the log-in user. This ensures accuracy and simplicity in judgments.

Hereinafter, editing the contact data registered in the shared address book will be described in details. In this embodiment, users can change addresses and other information registered in the shared address book. For example, as referred to FIG. 12, the user changes the address of the contact name "Taro Sato", from "sato@xxx.com" to "sato.taro@xxx.com", to solve the problem of duplicate contacts. Thus, in this figure, the contact duplication information is removed from the contacts with the contact names "Mr. Sato" and "Taro Sato" (although, only for the sake of explanation, the string "No Duplicate" is written in FIG. 12).

Figures 13, 14:
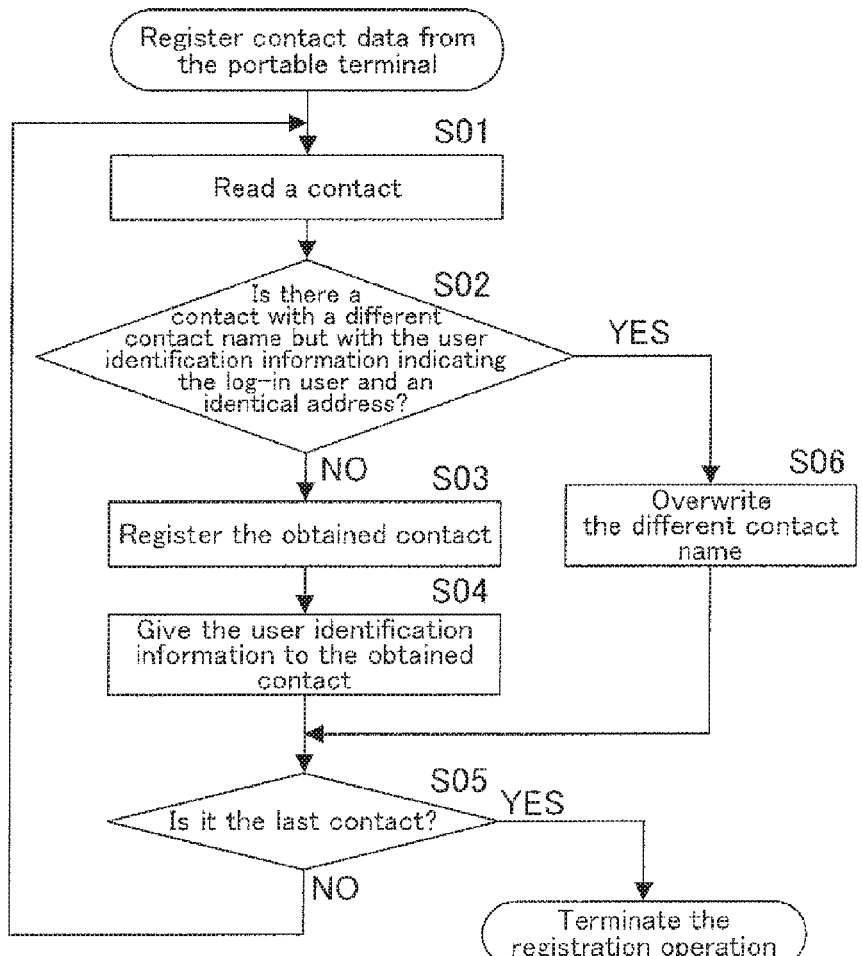
FIG. 13 illustrates another example of a shared address book containing a contact with an e-mail address having been changed.
FIG. 14 is a flowchart representing the operations of registering contact data from the portable terminal apparatus to the shared address book as shared data.

The shared address book may contain more than one contact with an address identical with that of the contact with the contact name "Taro Sato", and these are contacts with the contact names "Mr. Sato" and "Client Mr. Sato", for example, as shown in FIG. 13. In this case, the contact duplication information is removed from the contact with the contact name "Taro Sato", but it is not removed from the contacts with the contact names "Mr. Sato" and "Client Mr. Sato". In the above-described manner, the shared address book is kept clean and updated after being edited.

FIG. 14 and the following figures illustrate flowcharts representing the above-described operations of the MFP 1. The operations represented by the flowcharts are conducted by the CPU 11 of the MFP 1 running operation programs stored on a recording medium such as the ROM 12.

FIG. 14 is a flowchart representing the operations of registering contact data from the portable terminal 2 of a user to the shared address book as shared data.

In Step S01, a contact is obtained from the portable terminal 2. In Step S02, it is judged whether or not the shared address book contains a contact with a contact name different from that of the obtained contact but with the user identification information indicating the log-in user and an address identical with that of the obtained contact. If it contains no such contact (NO in Step S02), the obtained contact is registered to the shared address book in Step S03, and the user identification information is given to the obtained contact in Step S04. The routine then proceeds to Step S05. In Step S02, if the shared address book contains a contact with a contact name different from that of the obtained contact but with the user identification information indicating the log-in user and an address identical with that of the obtained contact (YES in Step S02), the different contact name is overwritten with the contact name of the obtained contact in Step S06. The routine then proceeds to Step S05. In this case, while the contact name is overwritten, the address and the user identification information are kept without changes. In the above-described manner, the shared address book is kept clean and updated with the latest contact names.

In Step S05, it is judged whether or not it is the last contact obtained from the portable terminal 2. If it is not the last contact (NO in Step S05), the routine returns to Step S01. If it is the last contact (YES in Step S05), the registration operation is terminated.

Figure 15:
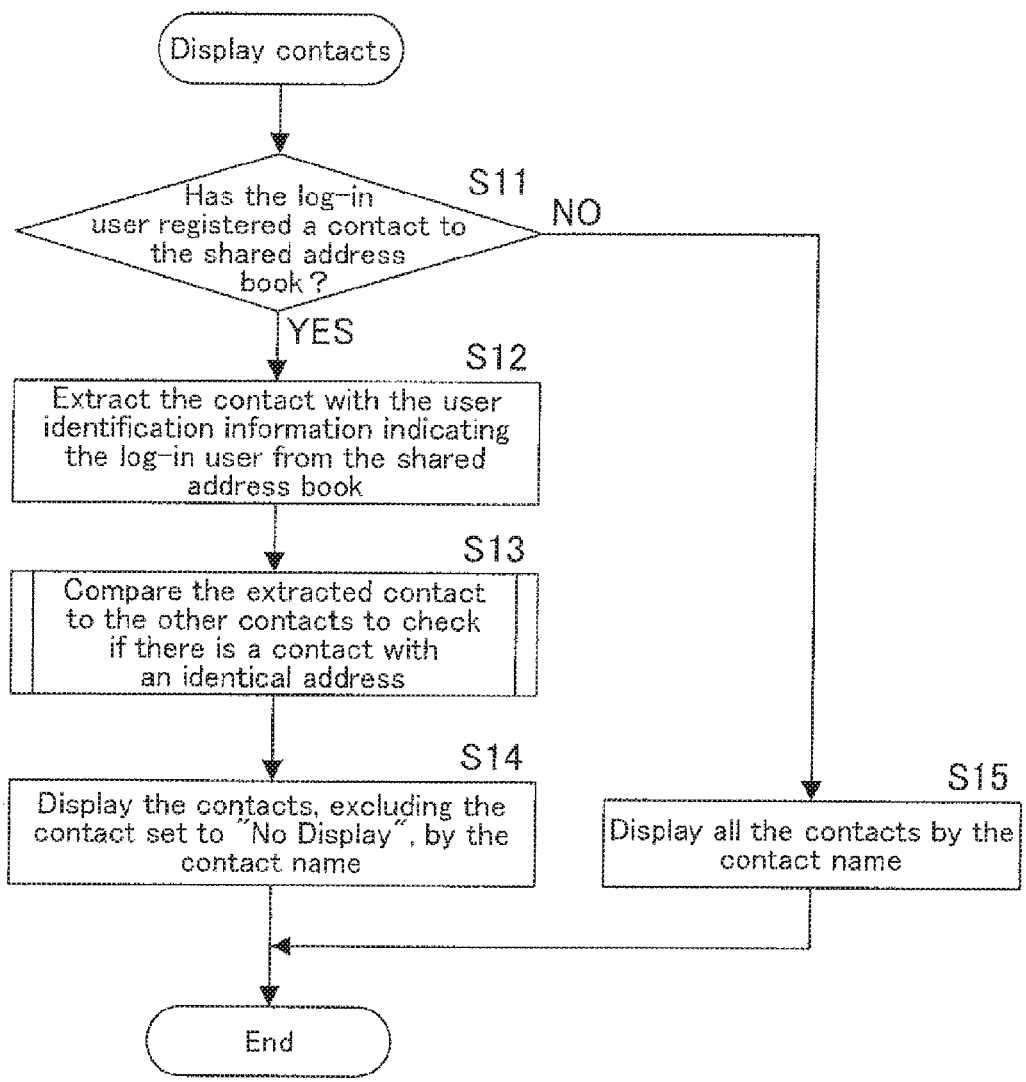
FIG. 15 is a flowchart representing the operation of displaying contacts for the user making a choice via a screen on a display.

FIG. 15 is a flowchart representing the operation of displaying contacts for the user making a choice via a screen on the display 171. In this flowchart, it is judged whether or not the shared address book contains contacts with different contact names but with identical addresses, without reference to contact duplication information.

In Step S11, it is judged whether or not the log-in user has registered a contact to the shared address book, depending on the presence or absence of the user identification information indicating the log-in user. If he/she has registered a contact (YES in Step S11), the contact with the user identification information indicating the log-in user is extracted from the shared address book in Step S12.

In Step S13, the extracted contact is compared to the other contacts to check if there is a contact with an e-mail address identical with that of the extracted contact. This operation will be further described with reference to a flowchart of FIG. 16.

Figure 16:
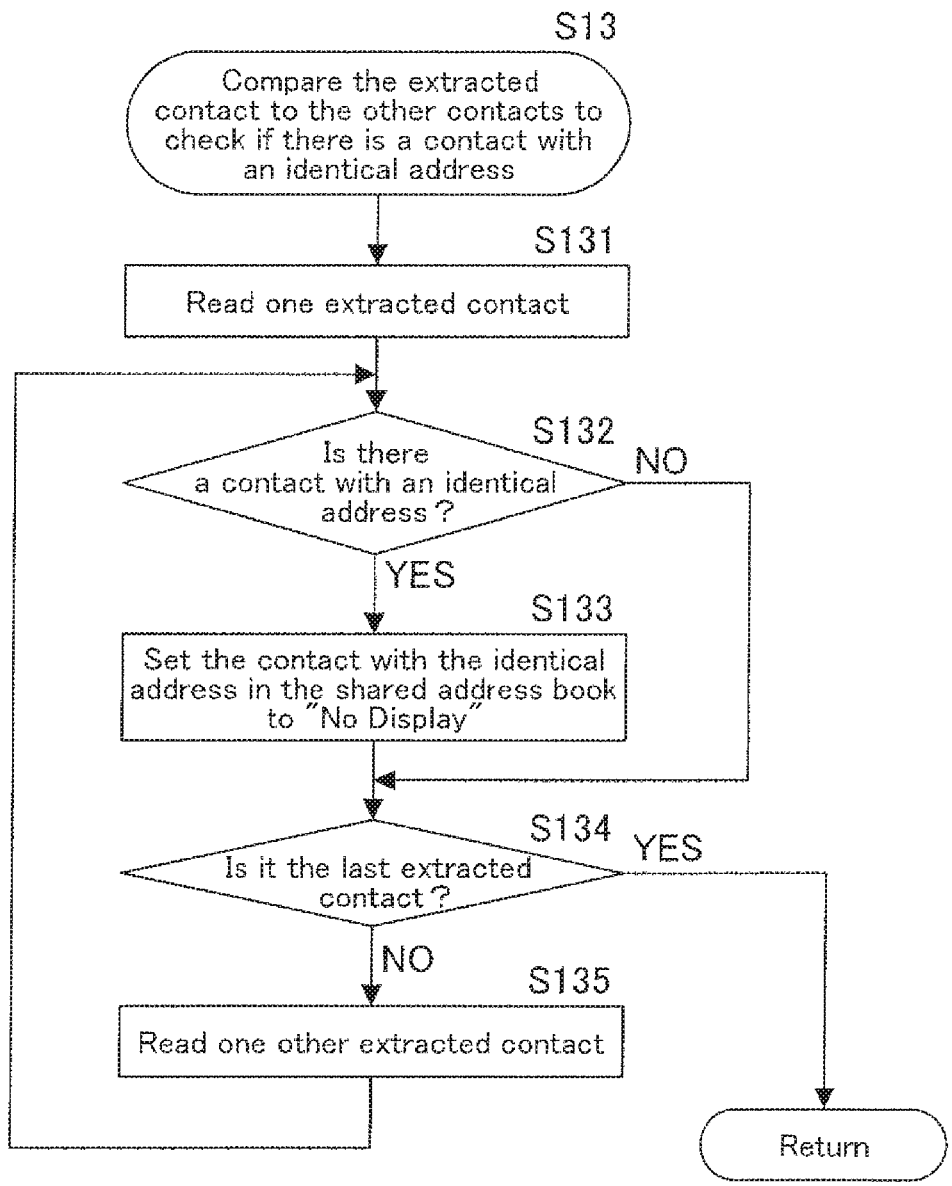
FIG. 16 is a flowchart representing a subroutine that is the operation of searching for a contact with an identical e-mail address, Step S13 of the FIG. 15 flowchart.

In Step S131 of FIG. 16, one extracted contact is read. In Step S132, it is judged whether or not the shared address book contains a contact with an address identical with that of the extracted contact, by comparing the extracted contact to the other contacts. If it contains such a contact (YES in Step S132), the contact with the identical address in the shared address book is set to "No Display" in Step S133. The routine then proceeds to Step S134. If it contains no such contact (NO in Step S132), the routine proceeds to Step S134 in a direct manner.

In Step S134, it is judged whether or not it is the last contact extracted from the shared address book. If it is not the last contact (NO in Step S134), one other extracted contact is read in Step S135. The routine then returns to Step S132. If it is the last contact (YES in Step S134), the routine returns to the FIG. 15 flowchart to continue to Step S14.

In Step S14, the contacts, excluding the contact set to "No Display" in Step S133 of the FIG. 16 flowchart since it has an address identical with that of the extracted contact, are displayed in the list by the contact name on the display 171.

Back to Step S11, if the log-in user has registered no contact to the shared address book (NO in Step S11), all the contacts are displayed by the contact name in Step S15.

Figure 17:
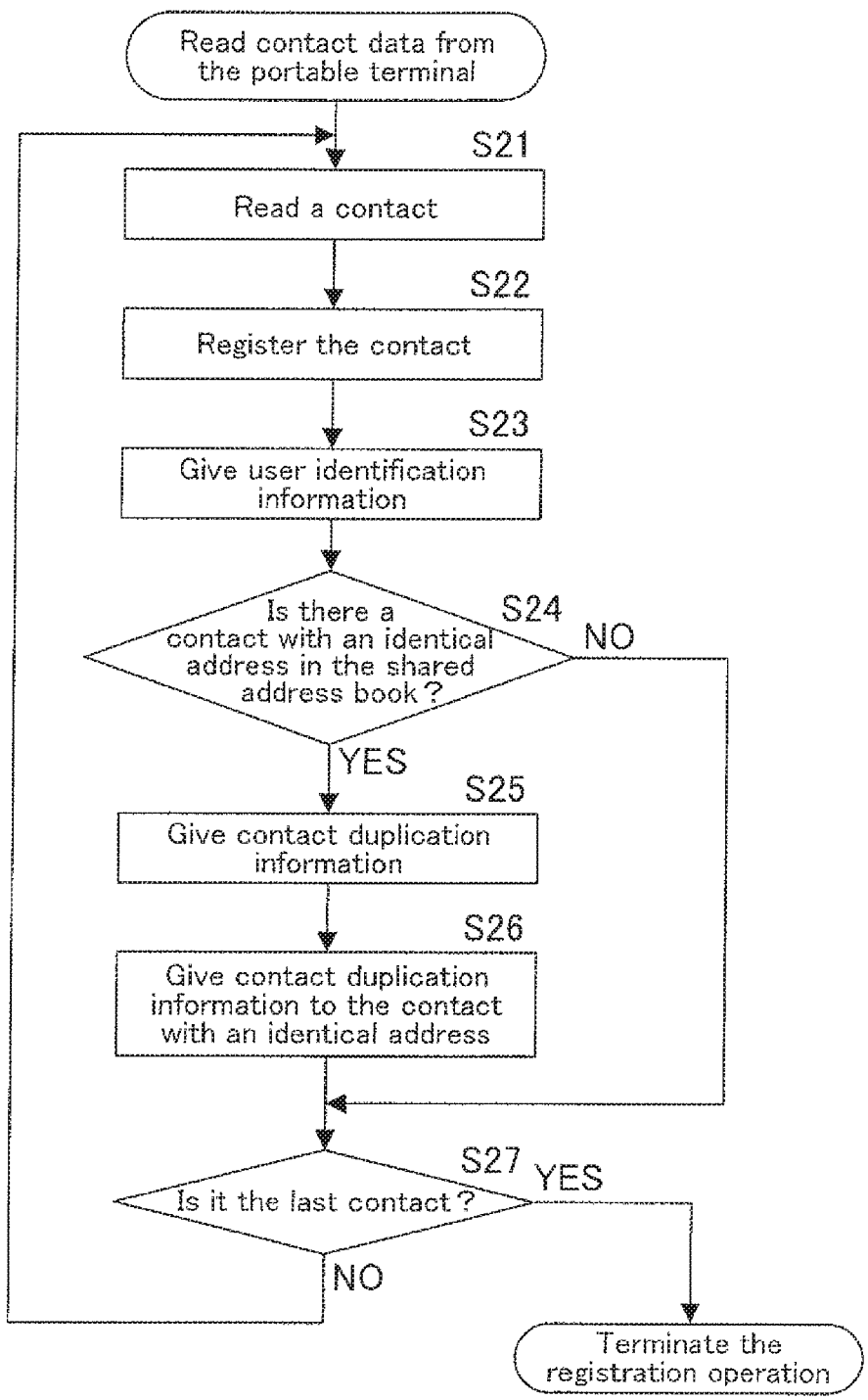
FIG. 17 is a flowchart representing the operation of registering contact data to the shared address book along with contact duplication information.

FIG. 17 is a flowchart representing the operation of registering contact data to the shared address book along with contact duplication information.

In Step S21, a contact is obtained from the portable terminal 2. In Step S22, the contact is registered to the shared address book.

In Step S23, user identification information is given to the contact. In Step S24, it is judged whether or not the shared address book contains a contact with an address identical with that of the contact registered in Step S22. If it contains no contact with an identical address (NO in Step S24), the routine proceeds to Step S27. If it contains a contact with an identical address (YES in Step S24), the routine proceeds to Step S25.

In Step S25, contact duplication information is given to the contact registered in Step S22. In Step S26, contact duplication information is also given to the contact with an identical address with that of the contact registered in Step S22. The routine then proceeds to Step S27.

In Step S27, it is judged whether or not it is the last contact obtained from the portable terminal 2. If it is not the last contact (NO in Step S27), the routine returns to Step S21. If it is the last contact (YES in Step S27), the registration operation is terminated.

Figure 18:
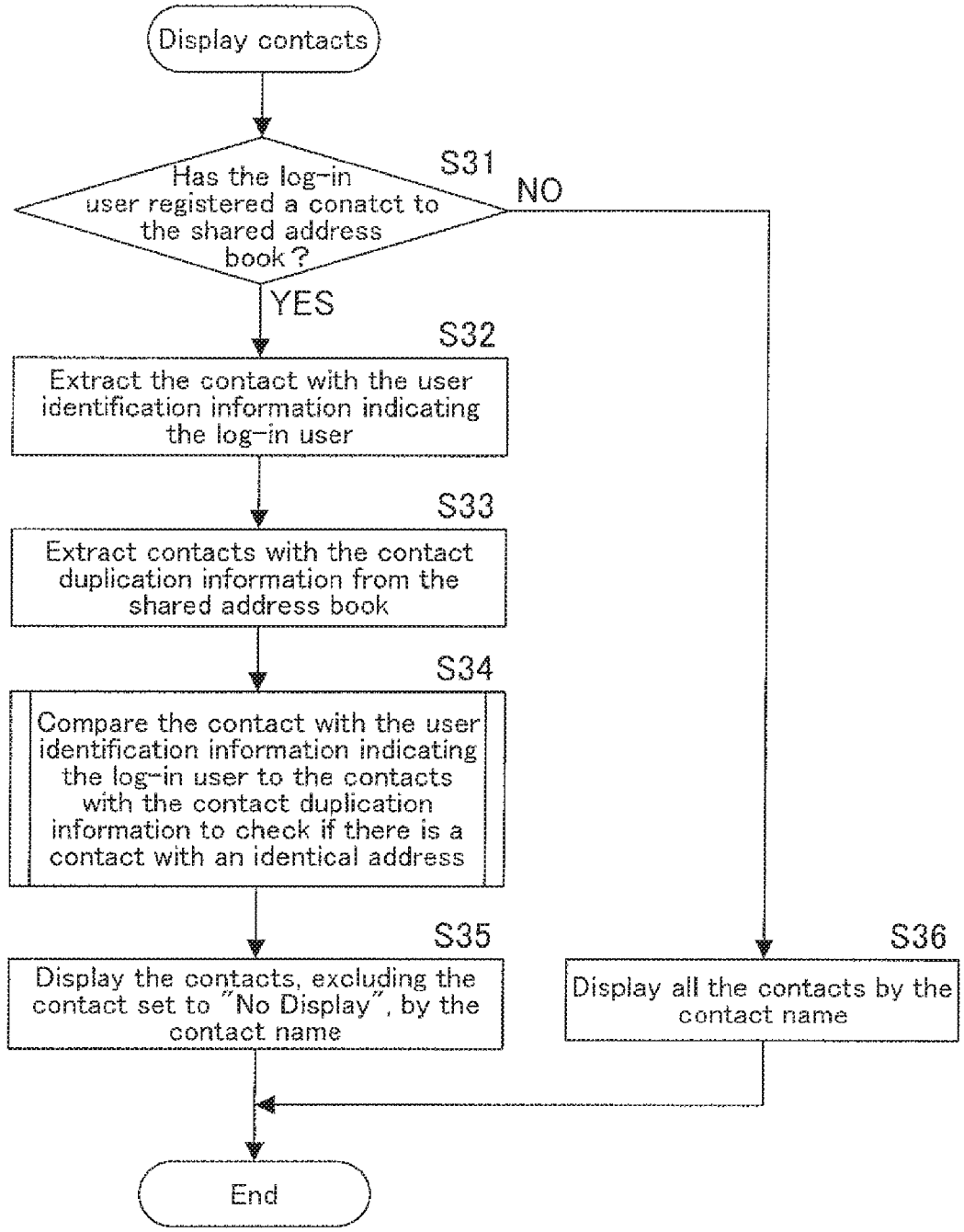
FIG. 18 is a flowchart representing the operation of displaying contacts for the user making a choice via a screen on a display, on the basis of the contact duplication information.

FIG. 18 is a flowchart representing the operation of displaying contacts for the user making a choice via a screen on the display 171, on the basis of the contact duplication information.

In Step S31, it is judged whether or not the log-in user has registered a contact to the shared address book. If he/she has registered a contact (YES in Step S31), the contact with the user identification information indicating the log-in user is extracted from the shared address book in Step S32.

In Step S33, contacts with the contact duplication information are also extracted from the shared address book. In Step S34, the contact extracted in Step S32 is compared to the contacts with the contact duplication information, which are extracted in Step S33, to check if there is a contact with an address identical with that of the contact extracted in Step S32. This operation will be further described with reference to a flowchart of FIG. 19.

Figure 19:
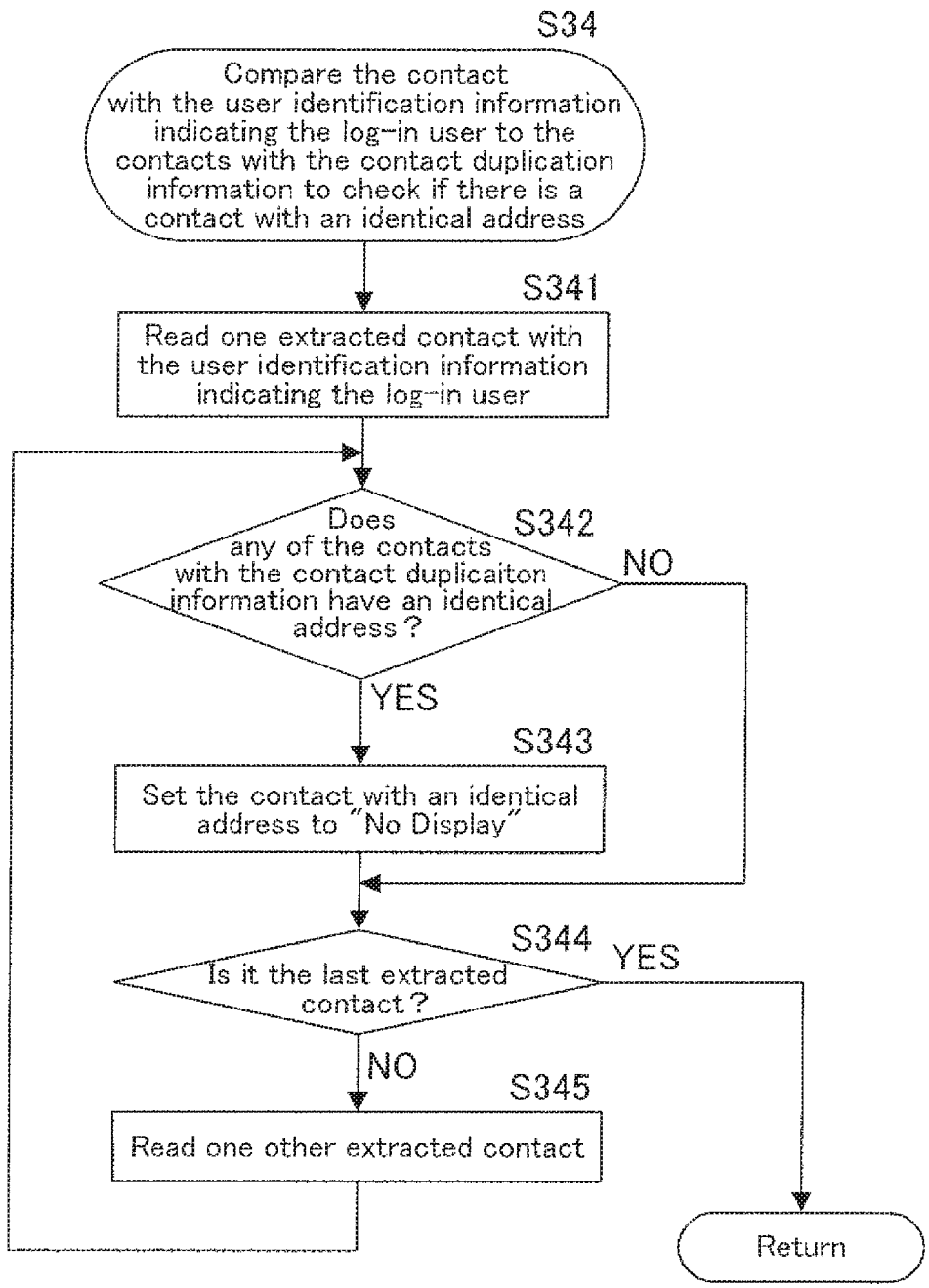
FIG. 19 is a flowchart representing a subroutine that is the operation of searching for a contact with an identical e-mail address, Step S34 of the FIG. 18 flowchart.

In Step S341 of FIG. 19, one extracted contact with the user identification information indicating the log-in user is read. In Step S342, it is judged whether or not any of the contacts with the contact duplication information has an address identical with that of the extracted contact.

If any of the contacts has an identical address (YES in Step S342), the contact with the identical address in the shared address book is set to "No Display" in Step S343. The routine then proceeds to Step S344. If none of the contacts has an identical address (NO in Step S342), the routine proceeds to Step S344 in a direct manner.

In Step S344, it is judged whether or not it is the last contact extracted from the shared address book. If it is not the last contact (NO in Step S344), one other extracted contact is read in Step S345. The routine then returns to Step S342. If it is the last contact (YES in Step S344), the routine returns to the FIG. 18 flowchart to continue to Step S35.

In Step S35, the contacts, excluding the contact set to "No Display" in Step S343 of the FIG. 19 flowchart since it has an address identical with that of the extracted contact, are displayed in the list by the contact name on the display 171.

Back to Step S31, if the log-in user has registered no contact to the shared address book (NO in Step S31), all the contacts are displayed by the contact name in Step S36.

Figure 20:
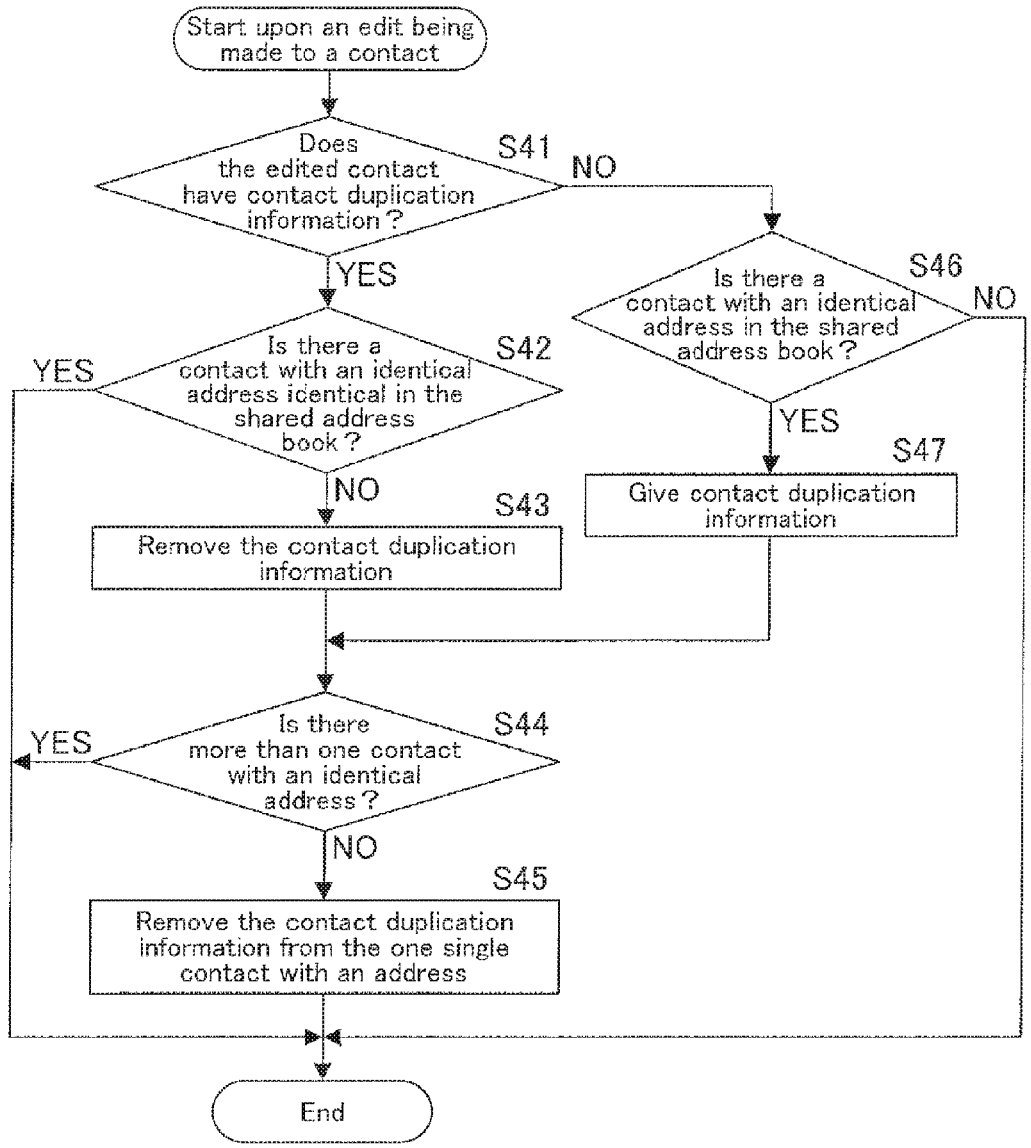
FIG. 20 is a flowchart representing the operation of correcting the contact duplication information when the user edits a contact registered in the shared address book by changing its e-mail address.

FIG. 20 is a flowchart representing the operation of correcting the contact duplication information when the user edits a contact registered in the shared address book by changing its address.

In Step S41, it is judged whether or not the edited contact has contact duplication information. If it has contact duplication information (YES in Step S41), it is then judged whether or not the shared address book contains a contact with address identical with a new address of the edited contact in Step S42. It it contains such a contact (YES in Step S42), the routine terminates because there is no need to correct the contact duplication information.

If it contains no such contact (NO in Step S42), the contact duplication information is removed from the edited contact in Step S43. It is then judged whether or not the shared address book contains more than one contact with an address identical with an old address of the edited contact in Step S44. If it contains one single such contact (NO in Step S44), the contact duplication information is removed from the one single such contact in Step S45. The routine then terminates. If it contains more than one contact with an address identical with an old address of the edited contact (YES in Step S44), the routine terminates. This means, the routine terminates without removing the contact duplication information from more than one such contact.

Back to Step S41, if the edited contact does not have contact duplication information (NO in Step S41), it is then judged whether or not the shared address book contains a contact with an address identical with a new address of the edited contact in Step S46. If it contains no such contact (NO in Step S46), the routine terminates. If it contains such a contact (YES in Step S46), contact duplication information is given to the contact in Step S47. The routine then proceeds to Step S44.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
   a communicator portion that communicates with a portable terminal apparatus having an address book;
   a contact data obtaining portion that obtains contacts from the address book of the portable terminal apparatus upon a user being logged in to the image processing apparatus through the communicator portion from the portable terminal apparatus, the contacts including contact names and addresses;
   a registration portion that registers the contacts to a shared address book as shared data along with user identification information indicating the logged-in user, the contacts being obtained by the contact data obtaining portion, the contacts including the contact names and the addresses;
   a display; and
   a display controller that makes the display show the contacts for the logged-in user making a choice, the contacts being registered in the shared address book, wherein the display controller judges whether or not the shared address book contains contacts with different contact names but with identical addresses, and when the shared address book contains the contacts with the different contact names but with the identical addresses, the display controller makes the display show the contact name of only any contact, among the contacts, having the user identification information indicating the logged-in user.

2. The image processing apparatus according to claim 1, wherein when the shared address book contains contacts with different contact names but with identical addresses and none of the contacts has the user identification information indicating the logged-in user, the display controller makes the display show each of the contacts with identical addresses by the contact name.

3. The image processing apparatus according to claim 1, wherein:
  upon registering each of the contacts to the shared address book along with the user identification information indicating the logged-in user, the contacts being obtained by the contact data obtaining portion, the contacts including the contact names and the addresses, the registration portion judges whether or not the shared address book contains a contact with an address identical with that of the each contact; when the shared address book contains the contact with the address identical with that of the each contact, the registration portion gives contact duplication information to both the each contact and the contact with an address identical with that of the each contact; and
  the display controller judges whether or not the shared address book contains contacts with different contact names but with identical addresses, depending on the presence of absence of the contact duplication information.

4. The image processing apparatus according to claim 3, further comprising an edit portion that allows the logged-in user to edit the shared address book, wherein:
  upon the logged-in user editing a contact with the contact duplication information in the shared address book by changing its address, the edit portion judges whether or not the shared address book contains a contact with an address identical with a new address after the change; when the shared address book contains the contact with the address identical with the new address after the change, the edit portion does not remove the contact duplication information from the edited contact, or when the shared address book does not contain a contact with an address identical with a new address after the change, the edit portion removes the contact duplication information from the edited contact; and
  when the shared address book contains more than one contact with an address identical with an old address before the change, the edit portion does not remove the contact duplication information from the more than one contact, or when the shared address book contains one single contact with an address identical with an old address before the change, the edit portion removes the contact duplication information from the one single contact.

5. The image processing apparatus according to claim 1, wherein upon registering each of the contacts to the shared address book along with the user identification information indicating the logged-in user, the contacts being obtained by the contact data obtaining portion, the contacts including the contact names and the addresses, the registration portion judges whether or not the shared address book contains a contact with a contact name different from that of the each contact but with the user identification information indicating the logged-in user and an address identical with that of the each contact; when the shared address book contains the contact with the contact name different from that of the each contact but with the user identification information indicating the logged-in user and the address identical with that of the each contact, the registration portion overwrites the different contact name with that of the each contact.

6. A shared address book display control method for an image processing apparatus, the shared address book display control method comprising:
  communicating with a portable terminal apparatus having an address book;
  obtaining contacts from the address book of the portable terminal apparatus upon a user being logged in to the image processing apparatus by communicating from the portable terminal apparatus, the contacts including contact names and addresses;
  registering the contacts to a shared address book as shared data along with user identification information indicating the logged-in user, the contacts being obtained from the address book of the portable terminal apparatus, the contacts including the contact names and the addresses; and
  making a display show the contacts for the logged-in user making a choice, the contacts being registered in the shared address book, judging whether or not the shared address book contains contacts with different contact names but with identical addresses, and, when the shared address book contains the contacts with the different contact names but with the identical addresses, making the display show the contact name of only any contact, among the contacts, having the user identification information indicating the logged-in user.

7. The shared address book display control method according to claim 6, wherein
  when the shared address book contains contacts with different contact names but with identical addresses and none of the contacts has the user identification information indicating the logged-in user, each the contacts with identical addresses are listed on the display by the contact name.

8. The shared address book display control method according to claim 6, wherein:
  upon registration of each of the contacts to the shared address book along with the user identification information indicating the logged-in user, the contacts being obtained from the address book of the portable terminal apparatus, the contacts including the contact names and the addresses, it is judged whether or not the shared address book contains a contact with an address identical with that of the each contact; when the shared address book contains the contact with the address identical with that of the each contact, contact duplication information is given to both the each contact and the contact with an address identical with that of the each contact; and
  it is judged whether or not the shared address book contains contacts with different contact names but with identical addresses, depending on the presence of absence of the contact duplication information.

9. The shared address book display control method according to claim 8, further comprising the step of allowing the logged-in user to edit the shared address book, wherein:
  upon the logged-in user editing a contact with the contact duplication information in the shared address book by changing its address, it is judged whether or not the shared address book contains a contact with an address identical with a new address after the change; when the shared address book contains the contact with the address identical with the new address after the change, the contact duplication information is not removed from the edited contact, or when the shared address book does not contain a contact with an address identical with a new address after the change, the contact duplication information is removed from the edited contact; and when the shared address book contains more than one contact with an address identical with an old address before the change, the contact duplication information is not removed from the more than one contact, or when the shared address book contains one single contact with an e-mail address identical with an old e-mail address before the change, the contact duplication information is removed from the one single contact.

10. The shared address book display control method according to claim 6, wherein upon registration of each of the contacts to the shared address book along with the user identification information indicating the logged-in user, the contacts being obtained from the address book of the portable terminal apparatus, the contacts including the contact names and the addresses, it is judged whether or not the shared address book contains a contact with a contact name different from that of the each contact but with the user identification information indicating the logged-in user and an address identical with that of the each contact; when the shared address book contains the contact with the contact name different from that of the each contact but with the user identification information indicating the logged-in user and the address identical with that of the each contact, the different contact name is overwritten with that of the each contact.

11. A non-transitory computer-readable recording medium storing a shared address book display control program to make a computer of an image processing apparatus execute the shared address book display control method according to claim 6.

12. The non-transitory computer-readable recording medium according to claim 11, storing the shared address book display control program, wherein when the shared address book contains contacts with different contact names but with identical addresses and none of the contacts has the user identification information indicating the logged-in user, each the contacts with identical addresses are listed on the display by the contact name.

13. The non-transitory computer-readable recording medium according to claim 11, storing the shared address book display control program, wherein:

upon registration of each of the contacts to the shared address book along with the user identification information indicating the logged-in user, the contacts being obtained from the address book of the portable terminal apparatus, the contacts including the contact names and the addresses, it is judged whether or not the shared address book contains a contact with an address identical with that of the each contact; when the shared address book contains the contact with the address identical with that of the each contact, contact duplication information is given to both the each contact and the contact with an address identical with that of the each contact; and it is judged whether or not the shared address book contains contacts with different contact names but with identical addresses, depending on the presence of absence of the contact duplication information.

14. The non-transitory computer-readable recording medium according to claim 13, storing the shared address book display control program further to make the computer of the image processing apparatus execute the step of allowing the logged-in user to edit the shared address book, wherein:

upon the logged-in user editing a contact with the contact duplication information in the shared address book by changing its address, it is judged whether or not the shared address book contains a contact with an address identical with a new address after the change; when the shared address book contains the contact with the address identical with the new address after the change, the contact duplication information is not removed from the edited contact, or when the shared address book does not contain a contact with an address identical with a new address after the change, the contact duplication information is removed from the edited contact; and when the shared address book contains more than one contact with an address identical with an old address before the change, the contact duplication information is not removed from the more than one contact, or when the shared address book contains one single contact with an address identical with an old address before the change, the contact duplication information is removed from the one single contact.

15. The non-transitory computer-readable recording medium according to claim 11, storing the shared address book display control program, wherein upon each of the contacts being registered to the shared address book along with the user identification information indicating the logged-in user, the contacts being obtained from the address book of the portable terminal apparatus, the contacts including the contact names and the addresses, it is judged whether or not the shared address book contains a contact with a contact name different from that of the each contact but with the user identification information indicating the logged-in user and an address identical with that of the each contact; when the shared address book contains the contact with the contact name different from that of the each contact but with the user identification information indicating the logged-in user and the address identical with that of the each contact, the different contact name is overwritten with that of the each contact.

16. An image processing apparatus comprising:
a communicator portion that communicates with a portable terminal apparatus having an address book;
a contact data obtaining portion that obtains contacts from the address book of the portable terminal apparatus upon a user being logged in to the image processing apparatus through the communicator portion from the portable terminal apparatus, the contacts including address identification information and addresses;
a registration portion that registers the contacts to a shared address book as shared data along with user identification information indicating the logged-in user, the contacts being obtained by the contact data obtaining portion, the contacts including the address identification information and addresses;
a display; and
a display controller that makes the display show the contacts for the logged-in user making a choice, the contacts being registered in the shared address book, wherein the display controller judges whether or not the shared address book contains contacts with different address identification information but with identical addresses, and when the shared address book contains the contacts with the different address identification information but with the identical addresses, the display controller makes the display show the address identification information of only any contact, among the contacts, having the user identification information indicating the logged-in user.

17. The image processing apparatus according to claim 16, wherein:
  upon registering each of the contacts to the shared address book along with the user identification information indicating the logged-in user, the contacts being obtained by the contact data obtaining portion, the contacts including the address identification information and the addresses, the registration portion judges whether or not the shared address book contains a contact with an address identical with that of the each contact; when the shared address book contains the contact with the address identical with that of the each contact, the registration portion gives contact duplication information to both the each contact and the contact with an address identical with that of the each contact; and
  the display controller judges whether or not the shared address book contains contacts with different address identification information but with identical addresses, depending on the presence of absence of the contact duplication information.

18. A non-transitory computer-readable recording medium storing a shared address book display control program to make a computer of an image processing apparatus execute:
  communicating with a portable terminal apparatus having an address book;
  obtaining contacts from the address book of the portable terminal apparatus upon a user being logged in to the image processing apparatus by communicating from the portable terminal apparatus, the contacts including address identification information and addresses;
  registering the contacts to a shared address book as shared data along with user identification information indicating the logged-in user, the contacts being obtained from the address book of the portable terminal apparatus, the contacts including the address identification information and addresses; and
  making a display show the contacts for the logged-in user making a choice, the contacts being registered in the shared address book, judging whether or not the shared address book contains contacts with different address identification information but with identical addresses, and, when the shared address book contains the contacts with the different address identification information but with the identical addresses, making the display show the address identification information of only any contact, among the contacts, having the user identification information indicating the logged-in user.

19. The non-transitory computer-readable recording medium according to claim 18, wherein:
  upon registering each of the contacts to the shared address book along with the user identification information indicating the logged-in user, the contacts being obtained from the address book of the portable terminal apparatus, the contacts including the address identification information and the addresses, it is judged whether or not the shared address book contains a contact with an address identical with that of the each contact; when the shared address book contains the contact with the address identical with that of the each contact, contact duplication information is given to both the each contact and the contact with an address identical with that of the each contact; and
  it is judged whether or not the shared address book contains contacts with different address identification information but with identical addresses, depending on the presence of absence of the contact duplication information.

* * * * *